US012701304B2

(12) United States Patent
Chen et al.

(10) Patent No.: US 12,701,304 B2
(45) Date of Patent: Aug. 4, 2026

(54) VIDEO GENERATION METHOD AND APPARATUS, AND DEVICE AND STORAGE MEDIUM

(71) Applicant: Lemon Inc., Grand Cayman (KY)

(72) Inventors: Jingjie Chen, Los Angeles, CA (US);
Tianyang Xu, Los Angeles, CA (US);
Siyao Yang, Los Angeles, CA (US);
Weikai Li, Los Angeles, CA (US);
Zihao Chen, Los Angeles, CA (US);
Changhao Ou, Los Angeles, CA (US);
Yixin Zhao, Culver City, CA (US);
Yiling Chen, Los Angeles, CA (US);
Sang Hyup Lee, Culver City, CA (US);
Yi Yue, Culver City, CA (US); Jie Liao, Los Angeles, CA (US);
Shengchuan Shi, Beijing (CN);
Zixiong Zhang, Los Angeles, CA (US);
Quan Wang, Los Angeles, CA (US);
Jian Sun, Los Angeles, CA (US); Aoyu Wang, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/730,674

(22) PCT Filed: Jan. 3, 2023

(86) PCT No.: PCT/SG2023/050001
§ 371 (c)(1),
(2) Date: Jul. 19, 2024

(87) PCT Pub. No.: WO2023/140782
PCT Pub. Date: Jul. 27, 2023

(65) Prior Publication Data
US 2025/0106483 A1 Mar. 27, 2025

(30) Foreign Application Priority Data

Jan. 20, 2022 (CN) ........................ 202210068353.X

(51) Int. Cl.
H04N 21/81 (2011.01)
G06T 17/00 (2006.01)
(Continued)

(52) U.S. Cl.
CPC ........... *H04N 21/816* (2013.01); *G06T 17/00* (2013.01); *H04N 21/4223* (2013.01); *H04N 21/47205* (2013.01)

(58) Field of Classification Search
None
See application file for complete search history.

(56) References Cited

U.S. PATENT DOCUMENTS

2008/0226253 A1 9/2008 Steinberg et al.
2011/0273369 A1* 11/2011 Imai ........................ G06T 15/50
345/158

(Continued)

FOREIGN PATENT DOCUMENTS

CN 108063936 A 5/2018
CN 109274977 A 1/2019
(Continued)

OTHER PUBLICATIONS

European Patent Office, Extended European Search Report Issued in Application No. 23743585.4, Mar. 17, 2025, Germany, 8 pages.
(Continued)

*Primary Examiner* — Samira Monshi
(74) *Attorney, Agent, or Firm* — Alleman Hall LLP

(57) ABSTRACT

Provided in the present disclosure are a video generation method and apparatus, and a device and a storage medium. The method includes: firstly, when an application request for
(Continued)

a target effect object has been received, acquiring location information of the current user; then, on the basis of the location information of the current user, determining a target place of interest (POI) corresponding to the current user; acquiring an effect resource of the target POI, and on the basis of the location information of the current user and location information of the target POI, determining a direction relationship between the current user and the target POI; on the basis of the direction relationship, displaying, on a photographic page, a photographic effect corresponding to the effect resource; and then on the basis of the photographic effect corresponding to the effect resource, generating a result video corresponding to the target effect object.

11 Claims, 3 Drawing Sheets

(51) Int. Cl.
 H04N 21/4223 (2011.01)
 H04N 21/472 (2011.01)

(56) References Cited

U.S. PATENT DOCUMENTS

| | | | |
|---|---|---|---|
| 2017/0069122 A1 | 3/2017 | Lee et al. | |
| 2017/0201709 A1 | 7/2017 | Igarashi et al. | |
| 2018/0276701 A1 | 9/2018 | He et al. | |
| 2019/0342620 A1 | 11/2019 | Yan | |
| 2020/0012857 A1 | 1/2020 | Jiang | |
| 2020/0134921 A1 | 4/2020 | Ishikawa | |
| 2021/0102820 A1* | 4/2021 | Le | G06F 1/1694 |
| 2021/0118236 A1 | 4/2021 | Hou | |

FOREIGN PATENT DOCUMENTS

| | | | |
|---|---|---|---|
| CN | 110286773 | A | 9/2019 |
| CN | 111143499 | A | 5/2020 |
| CN | 111638797 | A | 9/2020 |
| CN | 111881861 | A | 11/2020 |
| CN | 112351203 | A | 2/2021 |
| CN | 112511750 | A | 3/2021 |
| CN | 112843691 | A | 5/2021 |
| CN | 113137970 | A | 7/2021 |
| CN | 113784148 | A | 12/2021 |
| JP | 2006091390 | A | 4/2006 |
| JP | 20209447 | A | 1/2020 |
| WO | 2016017254 | A1 | 2/2016 |
| WO | 2018092016 | A1 | 5/2018 |
| WO | 2018139117 | A1 | 8/2018 |
| WO | 2021073278 | A1 | 4/2021 |

OTHER PUBLICATIONS

China National Intellectual Property Administration, Office Action Issued in Application No. 202210068353.X, Apr. 26, 2023, 16 pages.
ISA Intellectual Property Office of Singapore, International Search Report and Written Opinion Issued in Application No. PCT/SG2023/050001, Aug. 10, 2023, WIPO, 18 pages.
Lü, Q. et al., "Mobile Augmented Reality Technology and Service in Mobile Cloud Computing," ZTE Technology Journal, vol. 21, No. 2, Apr. 2015, 5 pages. Contains translation of abstract.
Japan Patent Office, Office Action Issued in Application No. 2024543197, Jun. 17, 2025, 8 pages.

* cited by examiner

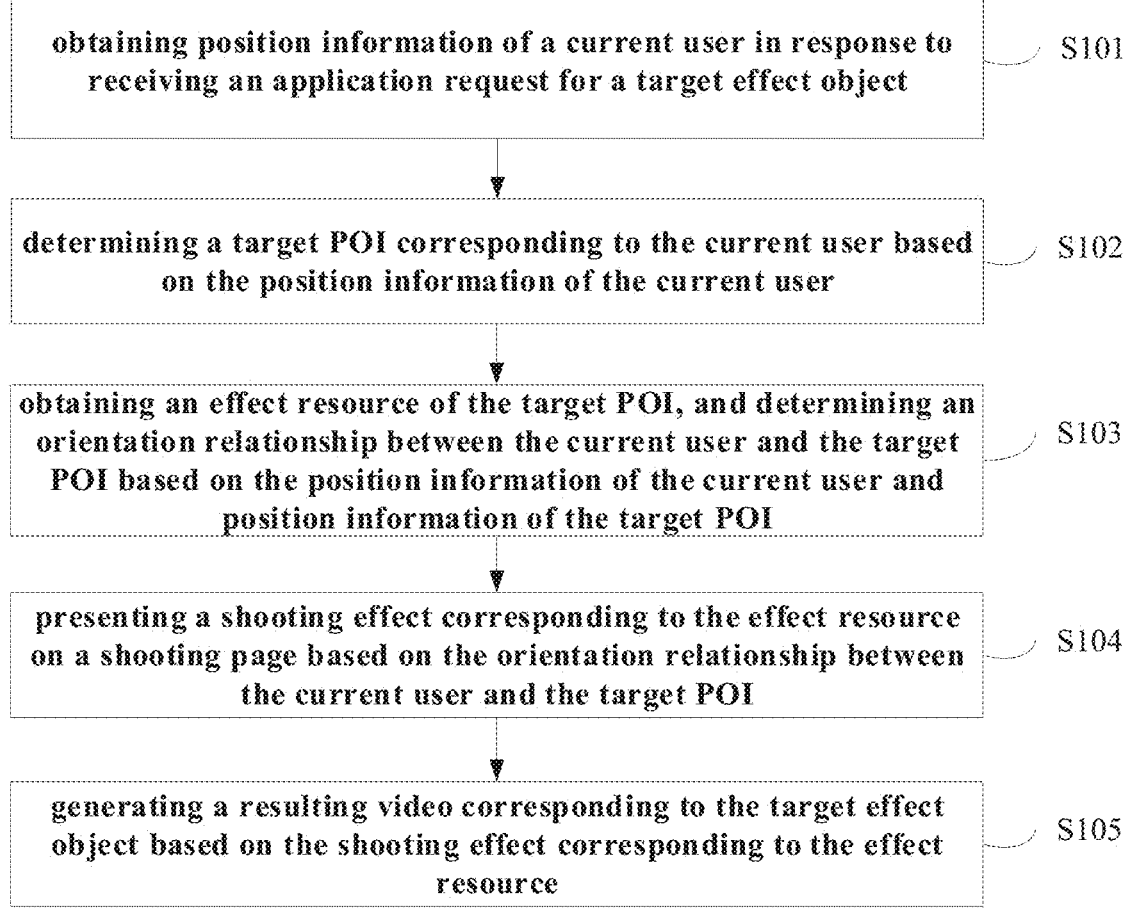

obtaining position information of a current user in response to receiving an application request for a target effect object — S101 determining a target POI corresponding to the current user based on the position information of the current user — S102 obtaining an effect resource of the target POI, and determining an orientation relationship between the current user and the target POI based on the position information of the current user and position information of the target POI — S103 presenting a shooting effect corresponding to the effect resource on a shooting page based on the orientation relationship between the current user and the target POI — S104 generating a resulting video corresponding to the target effect object based on the shooting effect corresponding to the effect resource — S105

FIG. 1

VIDEO GENERATION METHOD AND APPARATUS, AND DEVICE AND STORAGE MEDIUM

CROSS-REFERENCE TO RELATED APPLICATIONS

The present disclosure is a U.S. National Stage Application under 35 U.S.C. § 371 of International Patent Application No. PCT/SG2023/050001, filed on Jan. 3, 2023, which is based on and claims priority of Chinese application for invention 202210068353.X, filed on Jan. 20, 2022, the disclosure of each of these applications is hereby incorporated by reference herein in its entirety.

TECHNICAL FIELD

This disclosure relates to the field of data processing, in particular to a video generation method and apparatus, a device, and a storage medium.

BACKGROUND

Augmented Reality (AR) technology is a technology that fuse virtual information with real-world information. This technology loads virtual objects into the real world and interacts with the virtual objects by rendering the virtual objects in real-time images, thereby presenting a real environment and virtual objects in real-time on the same interface.

SUMMARY

In a first aspect, the present disclosure provides a video generation method, comprising:

obtaining position information of a current user in response to receiving an application request for a target effect object;

determining a target point of interest (POI) corresponding to the current user based on the position information of the current user;

obtaining an effect resource of the target POI, and determining an orientation relationship between the current user and the target POI based on the position information of the current user and position information of the target POI;

presenting a shooting effect corresponding to the effect resource on a shooting page based on the orientation relationship between the current user and the target POI;

generating a resulting video corresponding to the target effect object based on the shooting effect corresponding to the effect resource.

In some embodiments, determining a target point of interest (POI) corresponding to the current user based on the position information of the current user comprises:

determining a distance between the position information of the current user and each POI in a preset POI list;

determining a POI with a shortest distance from the position information of the current user as the target POI corresponding to the current user.

In some embodiments, before obtaining an effect resource of the target POI, the method further comprises:

determining whether the distance between the position information of the current user and the target POI is greater than a preset first threshold;

accordingly, obtaining an effect resource of the target POI comprises:

in response to determining that the distance between the position information of the current user and the target POI is greater than a preset first threshold, obtaining a first effect resource of the target POI; or in response to determining that the distance between the position information of the current user and the target POI is not greater than the preset first threshold, obtaining a second effect resource of the target POI.

In some embodiments, the effect resource of the target POI comprises at least one first virtual object associated with the target POI, the first virtual object carrying information to be presented; presenting the shooting effect corresponding to the effect resource on the shooting page comprises:

presenting the at least one first virtual object on the shooting page;

in response to a triggering operation on a target first virtual object on the shooting page, presenting information to be presented that is carried by the target first virtual object.

In some embodiments, the effect resource of the target POI comprises a virtual object generation control, and presenting a shooting effect corresponding to the effect resource on a shooting page comprises:

presenting the virtual object generation control on the shooting page;

generating a virtual object corresponding to the current user as a second virtual object based on the virtual object generation control;

presenting the second virtual object on the shooting page.

In some embodiments, after generating a virtual object corresponding to the current user based on the virtual object generation control, the method further comprises:

uploading the second virtual object and the target POI to a server; wherein, the server is used to establish an association between the second virtual object and the target POI.

In a second aspect, the present disclosure provides a video generation apparatus, comprising:

a position obtaining module configured to obtain position information of a current user in response to receiving an application request for a target effect object;

a POI determination module configured to determine a target POI corresponding to the current user based on the position information of the current user;

a resource obtaining module configured to obtain an effect resource of the target POI;

an orientation determination module configured to determine an orientation relationship between the current user and the target POI based on the position information of the current user and position information of the target POI;

a presentation module configured to present a shooting effect corresponding to the effect resource on a shooting page based on the orientation relationship between the current user and the target POI;

a generation module configured to generate a resulting video corresponding to the target effect object based on the shooting effect corresponding to the effect resource.

In a third aspect, the present disclosure provides a non-transitory computer-readable storage medium having instructions stored therein, wherein the instructions, when executed on a terminal device, cause the terminal device to implement the method described above.

In a fourth aspect, the present disclosure provides a device, comprising: a processor, a memory, and a computer program stored in the memory and executable on the processor, wherein the processor, when executing the computer program, implements the method described above.

In a fifth aspect, the present disclosure provides a computer program product, wherein the computer program product comprises a computer program/instructions, which implements the above method when executed by a processor.

In a sixth aspect, the present disclosure provides a computer program, comprising: instructions that, when executed by a processor, cause the processor to implement the video generation method of any embodiments above.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present invention or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

FIG. 1 is a flowchart of a video generation method provided in some embodiments of the present disclosure;

DETAILED DESCRIPTION

Figure 2:
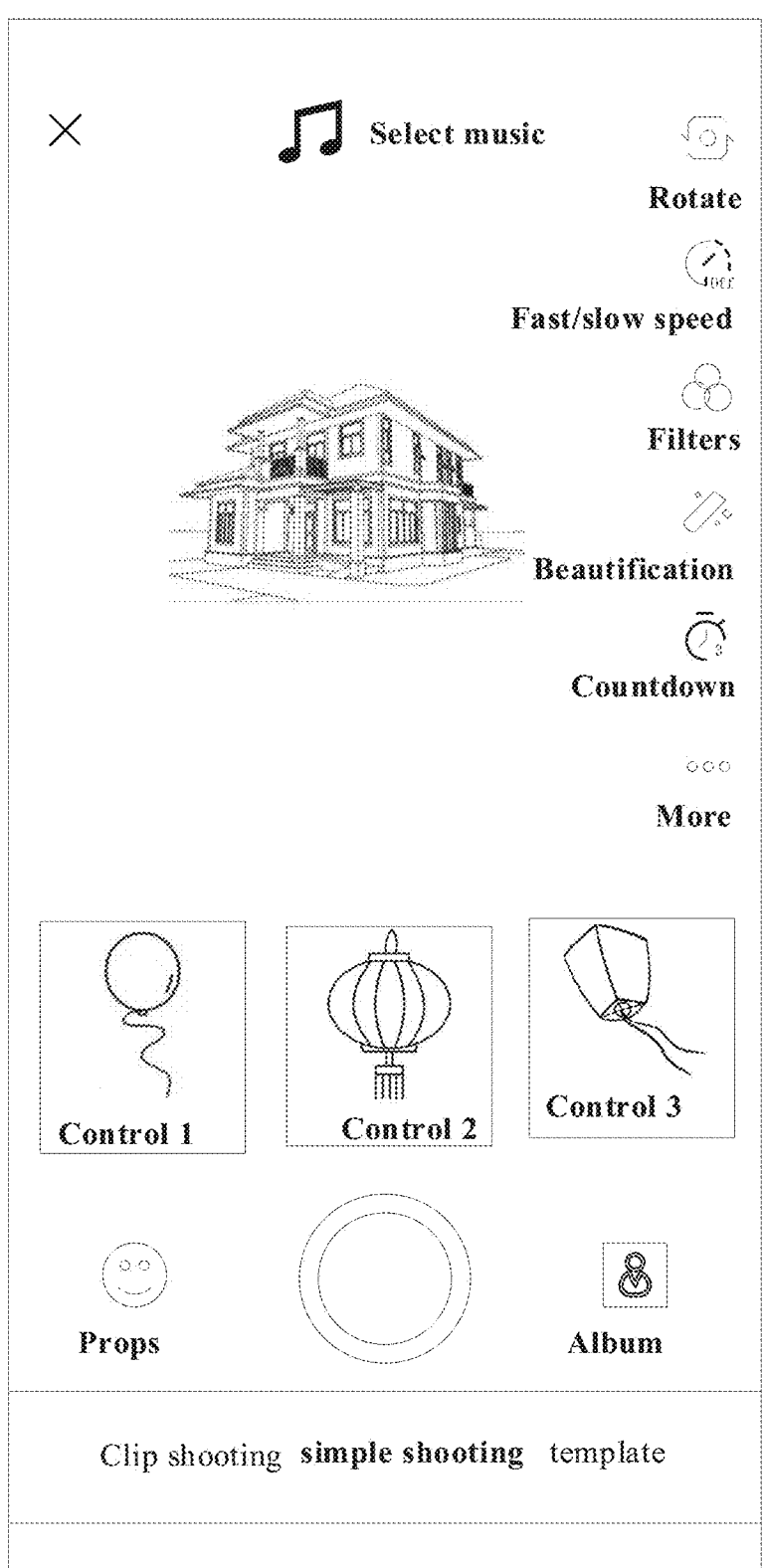
FIG. 2 is a diagram of displaying an effect object on a shooting page provided in some embodiments of the present disclosure.

In order to better understand the above objects, features and advantages of the present disclosure, the scheme of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure, and are not all of embodiments thereof.

With the continuous development of short video technology, the functions supported by short video platforms are becoming more and more diverse. However, no short video platform has yet integrated AR technology, and users cannot add AR effects when shooting videos, which may affect users' shooting experience.

In order to solve the above technical problems, this disclosure provides a video generation method and apparatus, a device, and a storage medium capable of determining a corresponding target POI and an effect resource associated with the target POI based on a user's current position, and determining an orientation relationship between the current position of the user and the position of the target POI, and presenting a shooting effect rendered by the effect resource to the user based on the determined orientation relationship, so that the shooting effect of the target POI may be integrated into a video shot by the user, and presented based on the orientation relationship between the user and the target POI, thereby enhancing the video shooting functions.

In order to enrich video content and improve the user's shooting experience, some embodiments of this disclosure provides a video generation method, comprising in response to receiving an application request for a target effect object, obtaining position information of a current user, then determining a target POI corresponding to the current user based on the position information of the current user, obtaining an effect resource of the target POI, presenting a shooting effect corresponding to the effect resource on a shooting page, and then generating a resulting video corresponding to the target effect object based on the shooting effect corresponding to the effect resource. Thus, the embodiments of the present disclosure determines a corresponding target POI and an effect resource associated with the target POI based on a user's current position, and determines an orientation relationship between the user and the target POI based on a user's current position and the position of the target POI, and then present a shooting effect rendered by the effect resource to the user based on the determined orientation relationship, so that the shooting effect of the target POI may be integrated into a video captured by the user, and may be presented based on the orientation relationship between the user and the target POI, thereby enhancing the video shooting functions.

On this basis, some embodiments of the present disclosure provides a video generation method. FIG. 1 is a flowchart of a video generation method provided in some embodiments of the present disclosure. The method comprises the following steps.

S101: obtaining position information of a current user in response to receiving an application request for a target effect object.

For example, the target effect object may be any of a plurality of effect objects presented on a shooting page. The effect objects may be a preset AR effect objects.

In practical applications, in response to a user opening a shooting page, a plurality of object controls are displayed to the user, each of the plurality of object controls corresponding to an effect object. The user may select a desired effect object by clicking on an object control. For example, as shown in FIG. 2, control 1, control 2, and control 3 are displayed the shooting page, with each control's corresponding effect object displayed by a corresponding icon. In response to the user clicking on control 1, an effect object corresponding to control 1 is determined as the target effect object, and the short video platform generates an application request for the target effect object. In response to an effect module corresponding to the short video platform receiving the application request for the target effect object, the position information of the current user is obtained.

For example, the position information of the current user may be obtained by a positioning module of the short video platform.

It should be noted that under the premise of complying with relevant laws and regulations, in response to determining that the current user wishes to use the video generation method provided in this disclosure and permits the use of the current user's position information, the embodiments of the present disclosure may obtain the position information of the current user in response to receiving an application request for the target effect object.

S102: determining a target POI corresponding to the current user based on the position information of the current user.

In some embodiments of the present disclosure, after obtaining the position information of the current user, a target Point of Interest (POI) corresponding to the current user may be determined based on the position information of the current user.

In some embodiments, a distance between the position information of the current user and each POI in a preset POI list may be determined; and a POI with the shortest distance in the position information of the current user is determined as the target POI corresponding to the current user.

The preset POI list is a pre-established list, and each POI in the preset POI list may be a famous scenic place, a landmark building, etc. in the real environment.

In some embodiments of the present disclosure, a distance between the current user and each POI may be calculated based on the position information of the current user and the position information of each POI in the preset POI list. Based on the calculated distances, a POI with a shortest distance to the current user may be selected from the various POIs as a target POI corresponding to the current user. As a result, the POI closest to the user is determined as the target POI corresponding to the current user, so that the shooting effect corresponding to the effect resource of the target POI presented on a subsequent shooting page is more consistent with the user's current position, which is conducive to improving the user's shooting experience.

In other embodiments, a plurality of candidate POIs which are closer to the position information of the current user may be filtered out from a POI database based on the position information of the current user, and may be presented to the current user for selection. One POI selected by the current user from the candidate POIs may be used as the target POI corresponding to the current user. This allows users to select the POIs they need, thereby increasing flexibility and personalization.

S103: obtaining an effect resource of the target POI, and determining an orientation relationship between the current user and the target POI based on the position information of the current user and position information of the target POI.

S104: presenting a shooting effect corresponding to the effect: resource on a shooting page based on the orientation relationship between the current user and the target POI.

For example, the effect resource of the target POI may comprise an effect template that matches the target effect object corresponding to the target POI, an effect associated with the target POI and posted by another user, and so on. The shooting effect corresponding to the effect resource may be an animation generated based on the effect resource of the target POI. For example, in response to the effect resource of the target POI being a virtual balloon, the shooting effect may be an animation of the virtual balloon drifting towards the target POI.

In addition, in order to facilitate users to understand relevant information of the target POI, the name of the target POI may also be obtained and displayed near the target POI in response to the shooting effect corresponding to the effect resource being presented.

In some embodiments of the present disclosure, after determining the target POI corresponding to the current user, an effect resource of the target POI may be obtained, and an orientation relationship between the current user and the target POI may be determined based on the position information of the current user and the position information of the target POI. For example, the position information may be represented as latitude and longitude coordinates. Based on the latitude and longitude coordinates of the current user and the target POI, an orientation of the current user to the target POI or an orientation of the target POI to the current user may be calculated.

In response to generating a shooting effect, the shooting effect corresponding to the effect resource may be presented on a shooting page based on the orientation relationship between the current user and the target POI. As a result, a corresponding shooting effect may be generated based on the orientation relationship between the user and the POI, and different orientations correspond to different shooting effects, thus presenting the true orientation of the POI in the effect and enhancing the user's shooting experience.

For example, using the Milky Way as an example of the effect resource, in response to the target POI being to the front left of the current user, a shooting effect may be generated and presented on a shooting page, in which the target POI is located to the front left and the Milky Way floats from the front right of the current user to the position of the target POI. In response to the target POI being directly in front of the current user, a shooting effect may be generated in which the target POI is located directly in front of the user and the Milky Way floats from opposite sides of the target POI towards the target POI.

It should be noted that in some embodiments of the present disclosure, for the same target effect object, the same virtual effect or different virtual effects may correspond to different POIs, and this disclosure is not limited thereto.

In some embodiments, the effect resource of the target POI comprises at least one first virtual object associated with the target POI, the first virtual object carrying information to be presented; presenting the shooting effect corresponding to the effect resource on the shooting page comprises:

presenting the at least one first virtual object on the shooting page;

in response to a triggering operation on a target first virtual object on the shooting page, presenting information to be presented that is carried by the target first virtual object.

For example, the target first virtual object is any virtual object among the at least one first virtual objects displayed on the shooting page. The target first virtual object may be determined by the current user's triggering operation. In response to the current user performing a triggering operation on a first virtual object on the shooting page, the first virtual object on which the triggering operation is performed is the target first virtual object.

In practical applications, in response to at least one first virtual object being presented on the shooting page, the at least one first virtual object is presented in a dynamic form, such that the at least one first virtual object is animated on the shooting page. It may be understood that in response to the target POI being to the front left of the current user, the at least one first virtual object presented on the shooting page may float from the front right to the front left of the current user in order to achieve the effect of a virtual object floating towards the target POI.

For the at least one first virtual object presented on the shooting page, the current user may perform a triggering operation on any of the first virtual objects. In response to the triggering operation on the target first virtual object on the shooting page, the information to be presented carried by the first target virtual object is presented on the shooting page.

For example, the information to be presented carried by the first virtual object may be information inputted by a user who posted the first virtual object when posting the first virtual object. For example, in response to the first virtual object being a wish lamp, the information to be presented may be wish information inputted by the user.

It should be noted that in some embodiments of the present disclosure, the current user may perform, on a preview image of the shooting page before starting shooting, a triggering operation on the first virtual object presented on the shooting page; during the process of shooting a video, a triggering operation may also be performed on a first virtual object presented on the shooting page. At that point, the target first virtual object on which a triggering operation is performed and the content of information to be presented that is carried by the target first virtual object are also recorded in the video.

In some embodiments of the present disclosure, by presenting at least one first virtual object associated with the target POI on the shooting page and in response to a triggering operation on the target first virtual object on the shooting page, the information to be presented carried by the target first virtual object is presented, allowing the user to view a virtual object posted and information inputted by others, thereby making the content of the target POI that the user viewing more diverse, which is conducive to improving user engagement.

In some embodiments, the effect resource of the target POI comprises a virtual object generation control, and presenting the virtual object generation control on the shooting page; generating a virtual object corresponding to the current user as a second virtual object based on the virtual object generation control; presenting the second virtual object on the shooting page.

For example, the virtual object generation control is associated with the target effect object. For example, in response to the target effect object being a lantern, the virtual object generation control is used to generate a lantern. For example, in response to the target effect object is a balloon, the virtual object generation control is used to generate a balloon.

In some embodiments of the present disclosure, after determining the target POI corresponding to the current user, a virtual object generation control that matches the target effect object corresponding to the target POI may be obtained, and the virtual object generation control may be presented on the shooting page. Thereafter, based on the virtual object generation control, a virtual object corresponding to the current user is generated, which is presented on the shooting page as a second virtual object.

For example, in response to a triggering operation on a virtual object generation control being received from the current user, a virtual object corresponding to the current user may be generated based on the virtual object generation control. For example, the virtual object generation control is a control used to generate a lantern. In response to the current user clicking on the virtual object generation control, a lantern corresponding to the current user is generated, and is presented on the shooting page.

For example, in response to receiving triggering operation performed by the current user on the virtual object generation control, an information input window may be displayed on the shooting page, and the information input by the current user through the information input window may be received. After the input is completed, a virtual object carrying the information input by the current user is generated as a second virtual object based on the information input by the current user and the virtual object generation control. The generated second virtual object is presented on the shooting page. In response to presenting the second virtual object, the information carried may be shown or hidden, which is not specifically limited in this disclosure.

In some embodiments of the present disclosure, in response to the virtual object generation control and the virtual object corresponding to the current user are presented on the shooting page, the presentation style is based on the orientation relationship between the target POI and the current user. For example, in response to the target POI being located to the front left of the current user, and in response to the virtual object generation control being presented on the shooting page, a presentation effect may be generated in which a virtual object generation control floats from the upper right of the current user to the center position of the shooting page, and in response to the virtual object corresponding to the current user, i.e., the second virtual object, being presented, a presentation effect may be generated in which the second virtual object floats from the current position of the second virtual object to the front left of the current user, giving a visual effect of the virtual object corresponding to the current user floating toward the target POI.

It should be noted that in some embodiments of the present disclosure, on a preview image of the shooting page, a virtual object corresponding to the current user may be generated and presented on a preset image before starting shooting. A virtual object corresponding to the current user can also be generated and presented on a video image during the video shooting process.

In some embodiments of the present disclosure, by displaying a virtual object generation control associated with the target POI on the shooting page and generating, based on the virtual object generation control, a virtual object corresponding to the current user that is presented on the shooting page, the user's own virtual object is generated, which is conducive to improving the user's sense of participation and ceremony, and thereby enhancing the user's shooting experience.

In some embodiments, after generating a virtual object corresponding to the current user based on a virtual object generation control, the second virtual object and the target POI may be uploaded to a server, wherein the server is used to establish an association between the second virtual object and the target POI.

In some embodiments of the present disclosure, the virtual object corresponding to the current user (i.e. the second virtual object) is uploaded to a server to establish an association between the virtual object corresponding to the current user and the target POI so that the server associates the target POI with the virtual object, thereby providing data support for presenting a shooting effect corresponding to the effect resource of the target POI on the shooting page, so that in response to a shooting effect corresponding to the effect resource of the target POI is presented on a shooting page of another user, the virtual object corresponding to the current user may be presented, thereby achieving the effect that each user can see the virtual objects uploaded by other users, which is conducive to improving the user's sense of participation.

It should be noted that in some embodiments of the present disclosure, the virtual object corresponding to the current user and the target POI are uploaded to a server in response to the authorization of the current user.

S105: generating a resulting video corresponding to the target effect object based on the shooting effect corresponding to the effect resource.

The technical solution provided in the embodiments of the present disclosure has at least the following beneficial effects over the related art.

Some embodiments of this disclosure provides a video generation method, comprising in response to receiving an application request for a target effect object, obtaining position information of a current user, then determining a target POI corresponding to the current user based on the position information of the current user, obtaining an effect resource of the target POI, determining an orientation relationship between the current user and the target POI, presenting a shooting effect corresponding to the effect resource on a shooting page based on the determined orientation relationship, and then generating a resulting video corresponding to the target effect object based on the shooting effect corresponding to the effect resource. Thus, the embodiments of the present disclosure can determine a corresponding target POI and an effect resource associated with the target POI based on a user's current position, and determine an orientation relationship between the current position of the user and the position of the target POI, and then present a shooting effect rendered by the effect resource to the user based on the determined orientation relationship, so that the shooting effect of the target POI may be integrated into a video captured by the user, and may be presented based on the orientation relationship between the user and the target POI, thereby enhancing the video shooting functions.

It may be understood that the resulting video corresponding to the target effect object is a video shot by the current user that comprises a virtual effect corresponding to the target effect object. The virtual effect corresponding to the target effect object is presented with a shooting effect corresponding to the effect resource of the target POI.

In some embodiments of the present disclosure, after the user starts shooting, based on the shooting effect corresponding to the effect resource of the target POI, a resulting video comprising the above shooting effect may be generated. The resulting video corresponds to a target effect object. For example, in response to the target effect object being a lantern, the resulting video comprises a virtual sky lantern, and in response to the target effect object being a balloon, the result video comprises a virtual balloon.

In response to the target effect object being an AR effect object, the shooting effect corresponding to the effect resource of the target POI is an AR effect. The AR effect of the target POI is presented on the shooting page. After the current user completes the shooting, the resulting video comprises the AR effect of the target POI. For example, in response to the target effect object being a lantern, the resulting video shot comprises the target POI and many virtual lanterns uploaded by other users or by the current user. These virtual lanterns are presented as animations in the resulting video, such as floating near the target POI.

In the video generation method provided in some embodiments of the present disclosure, in response to receiving an application request for a target effect object, position information of a current user is obtained, then a target POI corresponding to the current user is obtained based on the position information of the current user. An effect resource of the target POI is obtained, and an orientation relationship between the current user and the target POI is determined based on the position information of the current user and the position information of the target POI. A shooting effect corresponding to the effect resource is presented on a shooting page based on the determined orientation relationship, and then a resulting video corresponding to the target effect object is generated based on the shooting effect corresponding to the effect resource. Thus, the embodiments of the present disclosure can determine a corresponding target POI and an effect resource associated with the target POI based on a user's current position, and determine an orientation relationship between the current position of the user and the position of the target POI, and then present a shooting effect rendered by the effect resource to the user based on the determined orientation relationship, so that the shooting effect of the target POI may be integrated into a video captured by the user, and may be presented based on the orientation relationship between the user and the target POI, thereby enhancing the video shooting functions.

In some embodiments, before obtaining an effect resource of the target POI, whether the distance between the position information of the current user and the target POI is greater than a preset first threshold is determined; in response to determining that the distance between the position information of the current user and the target POI is greater than a preset first threshold, a first effect resource of the target POI is obtained; or in response to determining that the distance between the position information of the current user and the target POI is not greater than the preset first threshold, a second effect resource of the target POI is obtained.

For example, the preset first threshold may be preset. For example, the preset first threshold may be set to 3 kilometers.

In some embodiments of the present disclosure, after determining a target POI corresponding to the current user, a distance between the position information of the current user and the target POI may be further calculated, and whether the distance is greater than the preset first threshold is determined. In response to the distance between the position information of the current user and the target POI is greater than the preset first threshold, a first effect resource of the target POI is obtained; in response to the distance between the position information of the current user and the target POI being less than or equal to the preset first threshold, a second effect resource of the target POI is obtained.

For example, the first effect resource is different from the second effect resource.

For example, since the second effect resource is an effect resource corresponding to a case that a distance between the current user and the target POI is within a range defined by the preset first threshold, compared to the first effect resource, more abundant second effect resources are available. As an example, in response to the target effect object being a lantern, the first effect resource may be the Milky Way, and the second effect resource may be a combination of the Milky Way and a large lantern. Therefore, users who are far from the target POI may only see the Milky Way and may not see the effect of a large lantern, but users who are closer to the target POI may see not only the Milky Way but also the effect of a large lantern.

In this embodiment of the present disclosure, by obtaining a first effect resource of the target POI in response to the distance between the current user and the target POI being greater than a preset first threshold, and obtaining a second effect resource of the target POI in response to the distance between the current user and the target POI being less than or equal to the preset first threshold, different shooting effects and visual experiences are provided to users at the target POI and users not at the target POI, which is conducive to enabling users not at the target POI to have a complete effect experience, thereby generating interest in the effect of the target POI and guiding users to have interactions with the target POI.

In some embodiments, the first effect resource comprises at least one first virtual object associated with the target POI; The second effect resource comprises at least one first virtual object and a third virtual object associated with the target POI. The first virtual object may be a lantern that may be released by other users for the target POI, and the third virtual object may be a large lantern only presented near the target POI.

Figure 3:
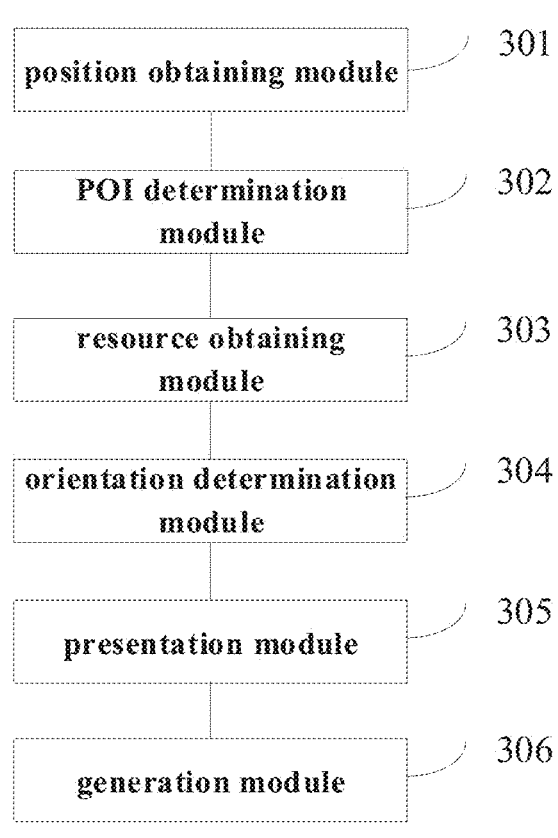
FIG. 3 is a schematic structural diagram of a video generation apparatus provided by some embodiments of the present disclosure.

On the basis of the same inventive concept of the above embodiment, some embodiments of the present disclosure further provides a video generation apparatus. FIG. 3 is a schematic structural diagram of a video generation apparatus provided in some embodiments of the present disclosure. The apparatus comprises:

a position obtaining module 301 configured to obtain position information of a current user in response to receiving an application request for a target effect object;

a POI determination module 302 configured to determine a target POI corresponding to the current user based on the position information of the current user;

a resource obtaining module 303 configured to obtain an effect resource of the target POI;

an orientation determination module 304 configured to determine an orientation relationship between the current user and the target POI based on the position information of the current user and position information of the target POI;

a presentation module 305 configured to present a shooting effect corresponding to the effect resource on a shooting page based on the orientation relationship between the current user and the target POI; and a generation module 306 configured to generate a resulting video corresponding to the target effect object based on the shooting effect corresponding to the effect resource.

In some embodiments, the POI determination module 302 comprises:

a distance calculation unit configured to determine a distance between the position information of the current user and each POI in a preset POI list; and a POI determination unit configured to determine a POI with a shortest distance from the position information of the current user as the target POI corresponding to the current user.

In some embodiments, the apparatus further comprises:

a second judgment module configured to determine whether the distance between the position information of the current user and the target POI is greater than a preset first threshold;

accordingly, the resource obtaining module 303 is further configured to:

in response to determining that the distance between the position information of the current user and the target POI is greater than a preset first threshold, obtain a first effect resource of the target POI; or in response to determining that the distance between the position information of the current user and the target POI is not greater than the preset first threshold, obtain a second effect resource of the target POI.

In some embodiments, the effect resource of the target POI comprises at least one first virtual object associated with the target POI, the first virtual object carrying information to be presented; the presentation module 305 is further configured to:

present the at least one first virtual object on the shooting page; and in response to a triggering operation on a target first virtual object on the shooting page, present information to be presented that is carried by the target first virtual object.

In some embodiments, the effect resource of the target POI comprises a virtual object generation control, and the presentation module 305 is further configured to:

present the virtual object generation control on the shooting page;

generate a virtual object corresponding to the current user as a second virtual object based on the virtual object generation control; and present the second virtual object on the shooting page.

In some embodiments, the first effect resource comprises at least one first virtual object associated with the target POI; the second effect resource comprises at least one first virtual object and a third virtual object associated with the target POI.

In the video generation apparatus provided in the embodiments of the present disclosure, in response to receiving an application request for a target effect object, position information of a current user is obtained, then a target POI corresponding to the current user is obtained based on the position information of the current user; an effect resource of the target POI is obtained, and an orientation relationship between the current user and the target POI is determined based on the position information of the current user and the position information of the target POI; a shooting effect corresponding to the effect resource is presented on a shooting page based on the determined orientation relationship, and then a resulting video corresponding to the target effect object is generated based on the shooting effect corresponding to the effect resource. Thus, the embodiment of the present disclosure can determine a corresponding target POI and an effect resource associated with the target POI based on a user's current position, and determine an orientation relationship between the current position of the user and the position of the target POI, and then present a shooting effect rendered by the effect resource to the user based on the determined orientation relationship, so that the shooting effect of the target POI may be integrated into a video captured by the user, and may be presented based on the orientation relationship between the user and the target POI, thereby enhancing the video shooting functions.

In addition to the above method and apparatus, some embodiments of the present disclosure further provides a non-transitory computer-readable storage medium stored thereon instructions that, when executed on a terminal device, cause the terminal device to implement the video generation method of the present disclosure.

Some embodiments of the present application further provides a computer program product containing a computer program/instructions that, when executed by a processor, implement the video generation method of the present disclosure.

Figure 4:
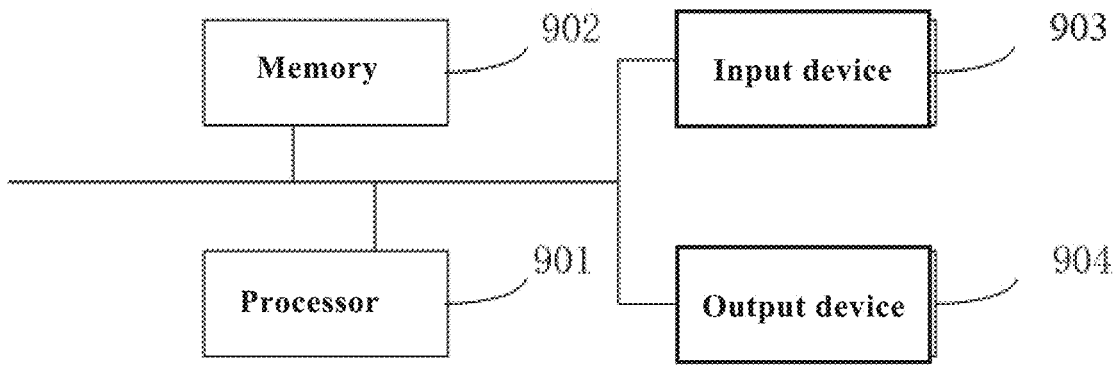
FIG. 4 is a schematic structural diagram of a video generation device provided by some embodiments of the present disclosure.

In addition, some embodiments of the present disclosure further provides a video generation device. As shown in FIG. 4, the video generation device may comprise:

a processor(s) 901, a memory 902, an input device 903, and an output device 904. The page generation device may comprise one or more processors 901. FIG. 4 shows one processor, as an example. In some embodiments of the present disclosure, the processor 901, memory 902, input device 903, and output device 904 may be connected through a bus or other means, wherein FIG. 4 shows a bus connection, as an example.

The memory 902 may be used to store software programs and modules. The processor 901 executes software programs and modules stored in memory 902 to perform various application functions and data processing of the video generation device. The memory 902 may mainly comprise a program storage area and a data storage area, wherein the program storage area may store an operating system, and applications required for at least one function, etc. Moreover, the memory 902 may comprises high speed random access memory, or may comprise non-volatile memory, such as at least one magnetic storage device, a flash memory device or other non-volatile solid-state storage device. The input device 903 may be used to receive an application request for a target effect object, and receive a triggering operation for a virtual object on a shooting page.

In the embodiments, the processor 901 will load executable files corresponding to the processes of one or more applications into the memory 902 in accordance with the following instructions, and the processor 901 will execute the applications stored in the memory 902, thereby implementing the various functions of the video generation device described above.

Note that, in this description, the use of relational terms, if any, such as "first" and "second" and the like are used solely to distinguish one from another entity or action without necessarily requiring or implying any actual such relationship or order between such entities or actions. Further, terms "comprise", "comprise" or their any other variations are intended to encompass non-exclusive composition, so that a process, method, product or device comprising a series of factors may comprise not only these factors, but also other factors that are not listed explicitly, or factors intrinsic to this process, method, product or device. Without limitation, a factor defined by wording "comprise one . . . " does not exclude the existence of other same factors in a process, method, product or device comprising such factor.

The above descriptions are only specific embodiments of the present disclosure, so that those skilled in the art can understand or implement the present disclosure. Various modifications to these embodiments will be apparent to those skilled in the art, and the generic principles defined herein may be implemented in other embodiments without departing from the spirit or scope of the present disclosure. Accordingly, the present disclosure should not be limited to the specific embodiments described herein, but should be accorded the broadest scope consistent with the principles and novel features disclosed herein.

What is claimed is:

1. A video generation method, comprising:
obtaining position information of a current user in response to receiving an application request for a target effect object;
determining a target point of interest (POI) corresponding to the current user based on the position information of the current user;
obtaining an effect resource of the target POI, and determining an orientation relationship between the current user and the target POI based on the position information of the current user and position information of the target POI;
presenting a shooting effect corresponding to the effect resource on a shooting page based on the orientation relationship between the current user and the target POI; and

generating a resulting video corresponding to the target effect object based on the shooting effect corresponding to the effect resource, wherein the determining the target POI corresponding to the current user based on the position information of the current user comprises:
determining a distance between the position information of the current user and each POI in a preset POI list; and
determining a POI with a shortest distance from the position information of the current user as the target POI corresponding to the current user.

2. The video generation method according to claim 1, further comprising, before the obtaining the effect resource of the target POI:
determining whether a distance between the position information of the current user and the target POI is greater than a preset first threshold,
wherein the obtaining the effect resource of the target POI comprises:
obtaining a first effect resource of the target POI, in response to determining that the distance between the position information of the current user and the target POI is greater than the preset first threshold; or
obtaining a second effect resource of the target POI, in response to determining that the distance between the position information of the current user and the target POI is not greater than the preset first threshold.

3. The video generation method according to claim 1, wherein the effect resource of the target POI comprises at least one first virtual object associated with the target POI, the first virtual object carrying information to be presented, and
the presenting the shooting effect corresponding to the effect resource on the shooting page comprises:
presenting the at least one first virtual object on the shooting page; and
presenting information to be presented carried by a target first virtual object on the shooting page, in response to a triggering operation on the target first virtual object.

4. The video generation method according to claim 1, wherein the effect resource of the target POI comprises a virtual object generation control, and
the presenting the shooting effect corresponding to the effect resource on the shooting page comprises:
presenting the virtual object generation control on the shooting page;
generating a virtual object corresponding to the current user as a second virtual object based on the virtual object generation control; and
presenting the second virtual object on the shooting page.

5. The video generation method according to claim 2, wherein the first effect resource comprises at least one first virtual object associated with the target POI, and the second effect resource comprises at least one first virtual object and a third virtual object associated with the target POI.

6. A non-transitory computer-readable storage medium, wherein the non-transitory computer-readable storage medium stores thereon instructions that, when executed on a terminal device, cause the terminal device to implement a video generation method comprising:
obtaining position information of a current user in response to receiving an application request for a target effect object;

determining a target point of interest (POI) corresponding to the current user based on the position information of the current user;

obtaining an effect resource of the target POI, and determining an orientation relationship between the current user and the target POI based on the position information of the current user and position information of the target POI;

presenting a shooting effect corresponding to the effect resource on a shooting page based on the orientation relationship between the current user and the target POI; and generating a resulting video corresponding to the target effect object based on the shooting effect corresponding to the effect resource, wherein the determining the target POI corresponding to the current user based on the position information of the current user comprises:

determining a distance between the position information of the current user and each POI in a preset POI list; and determining a POI with a shortest distance from the position information of the current user as the target POI corresponding to the current user.

7. An electronic device, comprising: a memory, a processor, and a computer program stored in the memory and executable on the processor, wherein the processor, when executing the computer program, implements a video generation method comprising:

obtaining position information of a current user in response to receiving an application request for a target effect object;

determining a target point of interest (POI) corresponding to the current user based on the position information of the current user;

obtaining an effect resource of the target POI, and determining an orientation relationship between the current user and the target POI based on the position information of the current user and position information of the target POI;

presenting a shooting effect corresponding to the effect resource on a shooting page based on the orientation relationship between the current user and the target POI; and generating a resulting video corresponding to the target effect object based on the shooting effect corresponding to the effect resource, wherein the processor, when executing the computer program, implements following steps:

determining a distance between the position information of the current user and each POI in a preset POI list; and determining a POI with a shortest distance from the position information of the current user as the target POI corresponding to the current user.

8. The electronic device according to claim 7, wherein the processor, when executing the computer program, implements following steps:

determining whether a distance between the position information of the current user and the target POI is greater than a preset first threshold;

obtaining a first effect resource of the target POI, in response to determining that the distance between the position information of the current user and the target POI is greater than the preset first threshold; or obtaining a second effect resource of the target POI, in response to determining that the distance between the position information of the current user and the target POI is not greater than the preset first threshold.

9. The electronic device according to claim 7, wherein the effect resource of the target POI comprises at least one first virtual object associated with the target POI, the first virtual object carrying information to be presented, and the processor, when executing the computer program, implements following steps:

presenting the at least one first virtual object on the shooting page; and presenting information to be presented carried by a target first virtual object on the shooting page, in response to a triggering operation on the target first virtual object.

10. The electronic device according to claim 7, wherein the effect resource of the target POI comprises a virtual object generation control, and the processor, when executing the computer program, implements following steps:

presenting the virtual object generation control on the shooting page;

generating a virtual object corresponding to the current user as a second virtual object based on the virtual object generation control; and presenting the second virtual object on the shooting page.

11. The electronic device according to claim 8, wherein the first effect resource comprises at least one first virtual object associated with the target POI, and the second effect resource comprises at least one first virtual object and a third virtual object associated with the target POI.

* * * * *